United States Patent
Schroth et al.

(10) Patent No.: US 6,825,442 B2
(45) Date of Patent: Nov. 30, 2004

(54) TAILOR WELDED BLANK FOR FLUID FORMING OPERATION

(75) Inventors: James G. Schroth, Troy, MI (US); Paul E. Krajewski, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 72 days.

(21) Appl. No.: 10/337,220

(22) Filed: Jan. 6, 2003

(65) Prior Publication Data

US 2004/0129690 A1 Jul. 8, 2004

(51) Int. Cl.⁷ .................................................. B23K 9/00
(52) U.S. Cl. ............................. 219/137 WM; 219/136
(58) Field of Search ................................. 219/137 WM, 219/137 R, 136; 228/234.1, 235.1, 262.1

(56) References Cited

U.S. PATENT DOCUMENTS

| | | | | |
|---|---|---|---|---|
| 3,222,763 A | * | 12/1965 | Heuer | 228/157 |
| 4,691,857 A | * | 9/1987 | Friedman | 228/265 |
| 5,974,847 A | | 11/1999 | Saunders et al. | 72/57 |
| 6,253,588 B1 | | 7/2001 | Rashid et al. | 72/57 |
| 6,450,369 B1 | * | 9/2002 | Heyes | 222/129.1 |
| 2002/0166222 A1 | * | 11/2002 | Kojima et al. | 29/421.1 |

OTHER PUBLICATIONS

Dieter, G.E.; Mechanical Metallurgy; McGraw Hill 1976, p. 195.*

* cited by examiner

Primary Examiner—M. Alexandra Elve
(74) Attorney, Agent, or Firm—Kathryn A. Marra

(57) ABSTRACT

A tailor welded blank for use in a fluid-forming operation includes a first sheet element having a physical characteristic with a first value and a second sheet element having the physical characteristic with a second value different from the first value. The first and second sheet elements are welded together at at least one weld region to form at least a portion of a tailor welded blank. When the tailor welded blank is processed in a fluid forming process, the first and second values of the physical characteristic result in said first and second sheet elements having approximately equal effective strength values such that said first and second sheet elements deform at an approximately equal rate during the fluid forming process and local thinning and failure initiation is reduced at the at least one weld region and throughout the first and second sheet elements.

18 Claims, 1 Drawing Sheet

TAILOR WELDED BLANK FOR FLUID FORMING OPERATION

BACKGROUND OF THE INVENTION

The present invention relates generally to forming and stamping of metal sheets and, in particular, to a tailor welded blank for use in a fluid forming process.

Tailor welded blanks are well known. A tailor welded blank consists of at least two sheet elements that are welded together at respective edges thereof, forming a weld region. Tailor welded blanks are typically utilized to form the welded sheet elements into various stamped metal components, including automotive door panels and the like. Tailor welded blanks have been used extensively in conventional stamping processes where the blank is placed in a die and a press punch is placed in contact with the blank to deform the blank to the shape of the die. Tailor welded blanks are advantageous because they eliminate the use of reinforcement members in the sheet assemblies, reducing manufacturing costs and scrap.

Tailor welded blanks for metal stamping can incorporate significant differences in thickness and/or strength of the sheet elements that are welded together to form the blank. During conventional stamping, frictional forces between the press punch and the blank being deformed restrain metal flow and limit strain localization and excessive thinning in the thinner and weaker sheet elements, which aids in preventing failure in or near the weld region. In conventional stamping, the part is formed by deformation of the tailor welded blank in contact with the punch. In conventional stamping, therefore, the punch acts similarly on any area of the tailor welded blank regardless of the sheet thickness, within the limits of the operative tool geometry.

Fluid forming of metal is also well known. Fluid forming operations involve the use of pressure from a fluid in a mold and die in order to deform a metal blank or tube into various shaped metal components, including automotive door panels and the like. In fluid forming, therefore, the part is formed by applying pressure to the tailor welded blank and not by deformation of the tailor welded blank with the press punch. Examples of fluid forming techniques include hydroforming, in which water is utilized as the pressurized fluid, and superplastic forming (SPF) or quick plastic forming (QPF), in which the tailor welded blank is first heated and then pressurized air or inert gas is utilized to shape the tailor welded blank to the die. Metal alloys are often classified as SPF or non-SPF rated materials.

Fluid forming of a prior art tailor welded blank with large differences in the effective strength of local regions, however, typically leads to rapid thinning and fracture of the thinnest or weakest elements of the tailor welded blank. The effective strength value may or may not be equal to a material strength value at ambient conditions. Failures in prior art tailor welded aluminum blanks that are fluid formed often initiate near the weld region. In contrast to conventional forming processes in which the solid punch contacts the blank and frictional forces limit the amount of strain near welded joints, in fluid forming, the blank is stretched by a fluid that exerts minimal frictional force on the faces of the blank. Because there are minimal frictional forces between the tailor welded blank and the pressurizing fluid in fluid forming, failures typically initiate and propagate rapidly from the joint discontinuity when sheet elements differ significantly in thickness. In fluid forming, the thinner and/or softer areas of the blank tend to deform to a greater extent than the thicker and/or harder areas of the blank and can fracture in the thin part of the sheet away from the weld as well.

Because the part is formed by pressure rather than displacement, prior art tailor welded blanks utilized in fluid forming operations are processed in a manner so that the regions of discontinuous thickness see very low strains, or are limited to welded sheets having very similar thicknesses. These restrictions limit the utility of tailor welded blanks for optimizing structures.

It is desirable, therefore, to provide a tailor welded blank that overcomes the disadvantages of the prior art and reduces local thinning and failure initiation near the weld region, and which can consist of constituent sheets with widely differing thicknesses.

SUMMARY OF THE INVENTION

A tailor welded blank for use in a fluid-forming operation includes a first sheet element having a physical characteristic with a first value and a second sheet element having the physical characteristic with a second value different from the first value. The first and second sheet elements are welded together at at least one weld region to form at least a portion of a tailor welded blank. When the tailor welded blank is processed in a fluid forming process, the first and second values of the physical characteristic result in the first and second sheet elements having approximately equal effective strength values. An equal effective strength is defined herein as a condition at which the first and second sheet elements respond, deform, and/or behave in the same manner when subjected to the same pressure in the fluid forming process. The effective strength value may or may not be equal to a material strength value at ambient conditions. Because the first and second sheet elements have approximately equal effective strength values, the first and second sheet elements deform at an approximately equal rate during the fluid forming process and local thinning and failure initiation is reduced at the at least one weld region and throughout the first and second sheet elements.

The physical characteristic of the first and second sheet elements may be one or more of, but is not limited to, a sheet thickness, a sheet temperature, a crystallographic texture, a value of flow stress or any other physical characteristic of the first and second sheet elements.

Preferably, the tailor welded blank includes a first sheet element having a first thickness and a first material strength value and a second sheet element having a second thickness and a second material strength value. If the second thickness is greater than the first thickness, preferably the first strength value is greater than the second strength value. The first and second material strength values are those of the respective materials during the fluid forming process.

Preferably, the present invention reduces local thinning and failure initiation and limits the propensity towards strain localization in the thinner material of the first sheet element at or near the weld region by increasing the effective strength of the first sheet element. The first and second sheet elements are chosen and oriented specifically so that significant forming strains can be obtained in the fluid forming process before local thinning and failure initiation can begin at the weld region. The present invention preferably reduces local thinning and failure initiation at the weld region by providing a material for the first sheet element so that it resists flow and strain localization during the fluid forming process. The approximately equal effective strength values of the first and second sheet members are obtained through a combination of grain size, solid solution strengthening, or precipitation strengthening mechanisms to provide the desired effective strength value at the operative forming temperature and strain rate. For example, the thin material of the first sheet element is a non-QPF grade material, such as the commercial aluminum alloy 5182, which exhibits higher flow stress than the material of the second sheet element, which is, for example, an SPF-grade material, such as the commercial SPF aluminum alloy 5083.

Alternatively, the present invention reduces local thinning and failure initiation at the weld region or in the thinner sheet by providing a material for the thinner sheet with a crystallographic texture that is more resistant to flow and thinning in the directions parallel to the primary forming strains known to occur in the fluid forming process.

Alternatively, the present invention reduces local thinning and failure initiation in the weld region or the tailor welded blank including the thinner sheet by processing the tailor welded blank in a differentially heated tool such that the local temperature of the weld region or of a critical portion of the tailor welded blank including the thinner first sheet element is maintained at a low temperature to increase the flow stress and decrease the propensity for material flow.

The tailor welded blank according to the present invention can be applied advantageously to many alloy systems including, but not limited to, at least one of steel, aluminum, magnesium, and titanium materials processed with fluid forming. The present invention can also be applied to those fluid forming processes in which the fluid directly contacts the member to be formed including, but not limited to, hydroforming, SPF, and QPF.

The present invention allows tailor welded blanks having sheet elements with different values of a physical characteristic, such as a sheet thickness, to be processed successfully into components. With this approach, the present invention allows structural mass efficiency, particularly in stiffness limited applications, to be optimized by placing material where it is needed in the tailor welded blank without the addition of independent reinforcement members.

Tailor welded blanks include sheet elements of varying thicknesses in order to address performance requirements. The present invention provides a tailor welded blank with variations in the thickness of sheet elements that is amenable to forming in a fluid forming process to large relative strains and consequently into complex shapes. The present invention advantageously allows the sheet elements that form a tailor welded blank to deform at nearly the same rate even though they have different values of a physical characteristic, such as different thicknesses or different material strength values.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
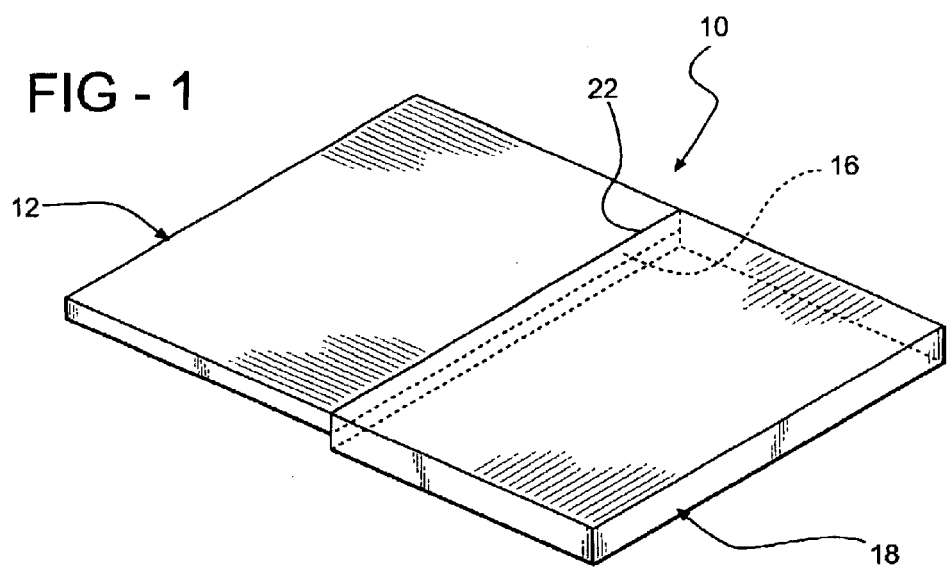
FIG. 1 is a perspective view of a tailor welded blank in accordance with the present invention.
Figure 2:
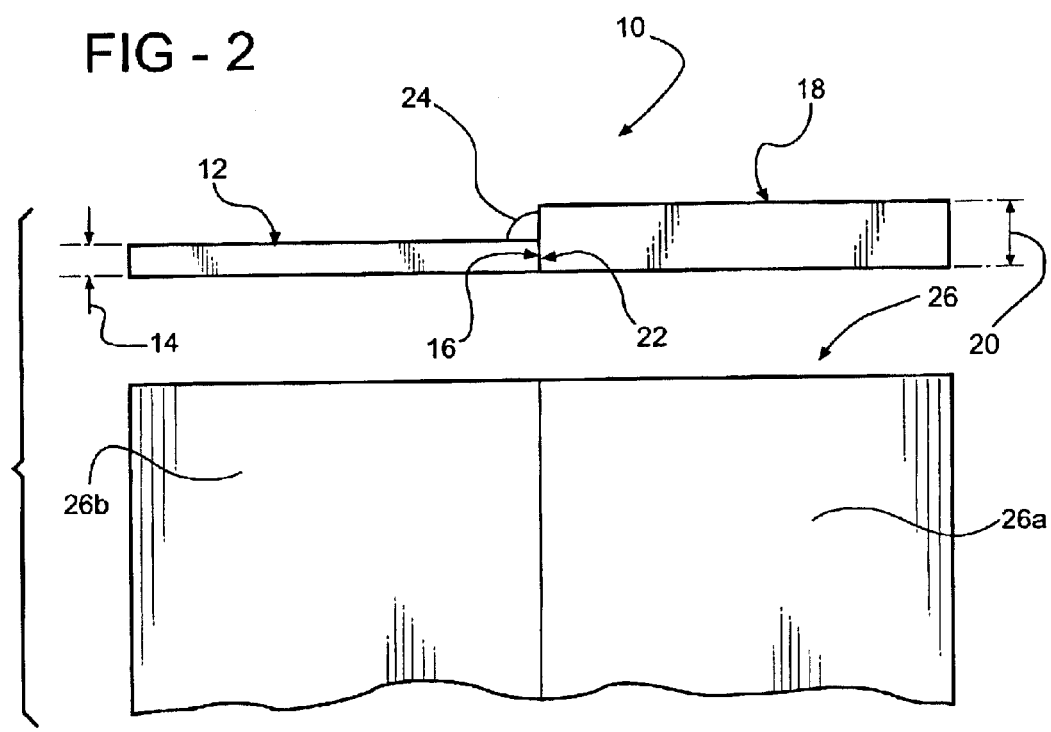
FIG. 2 is side view of the tailor welded blank shown in FIG. 1 shown adjacent a differentially heated tool.

Referring now to FIGS. 1 and 2, a first sheet element 12 is shown having a physical characteristic with a first value and a second sheet element 18 having the physical characteristic with a second value different from the first value. The first 12 and second 18 sheet elements are welded together at at least one weld region 24 to form at least a portion of a tailor welded blank 10. Weld region 24 is formed where edge 16 of first sheet element 12 lies at or against edge 22 of second sheet element 18. When the tailor welded blank 10 is processed in a fluid forming process, the first and second values of the physical characteristic result in the first 12 and the second 18 sheet elements having approximately equal effective strength values such that the first 12 and second 18 sheet elements deform at an approximately equal rate during the fluid forming process and local thinning and failure initiation is reduced at the at least one weld region 24 and throughout the first 12 and the second 18 sheet elements.

The physical characteristic of the first 12 and second 18 sheet elements may be one or more of, but is not limited to, a sheet thickness, a sheet temperature, a crystallographic texture, a value of flow stress, or any other physical characteristic of the first 12 and the second 18 sheet elements.

Preferably, the blank 10 includes the first sheet element 12 having a first thickness 14 and a first material strength value. The blank 10 also includes the second sheet element 18 having a second thickness 20 and a second material strength value. The second thickness 20 is greater than the first thickness 14. Preferably, the first material strength value is greater than the second material strength value. The first and second material strength values are those of the respective materials during the fluid forming process. The first material strength value and the second material strength value are different during a fluid forming process, discussed in more detail below.

The weld region 24 may be formed by any number of known welding processes including, but not limited to, laser welding, resistance seam welding, friction stir welding, MIG welding, and TIG welding. In operation, when the tailor welded blank 10 is subjected to pressure in a fluid forming process including, but not limited to, hydroforming, quick plastic forming, or superplastic forming, local thinning and failure initiation are reduced near the weld region 24 and throughout the first 12 and the second 18 sheet elements.

Preferably, the tailor welded blank 10 in accordance with present invention reduces local thinning and failure initiation and limits the propensity towards strain localization in the thinner material of the first sheet element 12 or at or near the weld region 24 by increasing the effective strength of the first sheet element 12. Preferably, the effective strength of the first sheet element 12 and the effective strength of the second sheet element 18 are equal at forming temperature when the tailor welded blank 10 is subjected to a fluid forming process. The first 12 and second 18 sheet elements are chosen and oriented specifically so that significant forming strains can be obtained in the fluid forming process before local thinning and failure initiation can begin at the weld region 24. The present invention preferably reduces local thinning and failure initiation at the weld region 24 by providing a higher-strength material for the first sheet element 12 so that it resists flow and strain localization during the fluid forming process. The approximately equal effective strength values between the first 12 and second 18 sheet members are obtained through a combination of grain size, solid solution strengthening mechanisms, or precipitation strengthening mechanisms. For example, the thin material of the first sheet element 12 is a non-SPF grade material, such as the commercial aluminum alloy 5182, which exhibits higher flow stress than the material of the second sheet element 18, which is, for example, an SPF-grade material, such as the commercial SPF aluminum alloy 5083.

Alternatively, the present invention reduces local thinning and failure initiation in the first sheet element 12 or at the weld region 24 by providing a material for the thinner first sheet element 12 with a crystallographic texture that is more resistant to flow and thinning in the directions parallel to the primary forming stresses known to occur in the fluid forming process.

Alternatively, the present invention reduces local thinning and failure initiation at the weld region 24 by processing the tailor welded blank 10 in a differentially heated tool 26 that includes a heating system (not shown) disposed therein that is operable to adjust the respective forming temperatures of the first sheet element 12, the weld region 24, and the second sheet element 18. Preferably, the tool 26 is adapted to set a portion 26a thereof and a portion 26b thereof at different temperatures. Preferably, the temperature differential between the portions 26a and 26b is set to adjust the respective forming temperatures such that the local temperature of the weld region 24 or of the thinner first sheet element 12 is maintained at a low temperature to increase the flow stress and decrease the propensity for material flow. Preferably, the heating system of the tool 26 maintains the local temperature of the weld region 24 or of the thinner first sheet element 12 at a low temperature by heated fluid (not shown) flowing in chambers (not shown) in the tool 26, electric heating elements (not shown) disposed in the tool 26 or a similar system.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A tailor welded blank for use in a fluid-forming operation, comprising:
    a first sheet element having at least one physical characteristic with a first value;
    a second sheet element having said at least one physical characteristic with a second value different from said first value, said first and second sheet elements being welded together at abutting edges of said first and second sheet elements to form at least a portion of a tailor welded sheet blank,
    whereby when said tailor welded blank is processed in a fluid forming process fluid pressure acts on one side of said sheet blank including one side of said first and second sheet elements and said weld at said abutting edges to push the other side of said blank including the other side of said first and second sheet elements against a forming surface, said first and second values of said at least one physical characteristic result in said first and second sheet elements having approximately equal effective strength values such that said first and second sheet elements deform at an approximately equal rate during the fluid forming process and local thinning and failure initiation is reduced at said at least one weld region and throughout said first and second sheet elements.

2. The tailor welded blank according to claim 1 wherein said at least one physical characteristic is a thickness of each of said first and second sheet elements.

3. The tailor welded blank according to claim 1 wherein said at least one physical characteristic is a material strength value of said first and second sheet elements.

4. The tailor welded blank according to claim 3 wherein said material strength of said first and second sheet elements is obtained by at least one of a grain size, a solid solution strengthening mechanism, and a precipitation strengthening mechanism.

5. The tailor welded blank according to claim 1 wherein said at least one physical characteristic is a crystallographic texture of said first and second sheet elements, said crystallographic texture being resistant to flow and thinning in a direction parallel to a primary forming stress in the fluid forming process.

6. The tailor welded blank according to claim 1 wherein said at least one physical characteristic is a forming temperature of said first and second sheet elements.

7. The tailor welded blank according to claim 6 wherein said different values of said forming temperature are generated by performing the fluid forming process in a differentially heated tool that maintains a one of said first and second sheet elements at a lower forming temperature than another of said first and second sheet elements.

8. The tailor welded blank according to claim 1 wherein said weld region is formed by a one of laser welding, resistance seam welding, friction stir welding, MIG welding, and TIG welding.

9. The tailor welded blank according to claim 1 wherein each of said first and second sheet elements is formed from at least one of steel, magnesium, titanium and aluminum material.

10. A method for creating a tailor welded blank for use in a fluid-forming operation, comprising the steps of:
    providing at least two sheet elements, a one of said sheet elements having a first value of at least one physical characteristic and another of said sheet elements having a second value of said at least one physical characteristic different from said first value;
    welding abutting edges of said at least two sheet elements together at a weld region to form a tailor welded sheet blank; and
    subjecting one side of said tailor welded blank including one side of said sheet elements and said welded abutting edges to pressure in a fluid forming process to push the other side of said welded blank including the other sides of said sheet elements against a forming surface, said first and second values of said at least one physical characteristic result in said at least two sheet elements having approximately equal effective strength values such that said at least two sheet elements deform at an approximately equal rate during the fluid forming process and local thinning and failure initiation is reduced at said at least one weld region and throughout said at least two sheet elements.

11. The method according to claim 10 wherein said at least one physical characteristic is a thickness of said at least two sheet elements.

12. The method according to claim 10 wherein said at least one physical characteristic is a material strength of said at least two sheet elements.

13. The method according to claim 12 wherein said material strength value of said first and second sheet elements is obtained by at least one of a grain size, a solid solution strengthening mechanism, or a precipitation strengthening mechanism.

14. The method according to claim 10 wherein said at least one physical characteristic is a crystallographic texture of said at least two sheet elements, said crystallographic texture being resistant to flow and thinning in a direction parallel to a primary forming stress in the fluid forming process.

15. The method according to claim 10 wherein said at least one physical characteristic is a forming temperature of said at least two sheet element portions.

16. The method according to claim 15 wherein different forming temperatures values are generated by a differentially heated tool that maintains a one of said at least two sheet elements at a lower forming temperature than another of said at least two sheet elements.

17. The method according to claim 10 wherein said welding step is performed by a one of laser welding, resistance seam welding, friction stir welding, MIG welding, and TIG welding.

18. The method according to claim 10 wherein each of said at least two sheet elements is formed from at least one of steel, magnesium, titanium and aluminum material.

* * * * *